United States Patent [19]

Fiske, Jr.

[11] 4,301,887
[45] Nov. 24, 1981

[54] ACCELERATION-RESPONSIVE APPARATUS FOR SENSING FIRING INSTANT OF AN AIR GUN

[75] Inventor: Augustus H. Fiske, Jr., 66 Hill Rd., Redding, Conn. 06896

[73] Assignee: Bolt Associates, Inc., Norwalk, Conn.

[21] Appl. No.: 90,608

[22] Filed: Nov. 2, 1979

[51] Int. Cl.³ .............................................. G01V 1/26
[52] U.S. Cl. .................... 181/107; 181/120; 73/652; 367/185; 310/15; 310/30
[58] Field of Search ............... 181/107, 120; 367/182, 367/185; 310/15, 30; 73/652

[56] References Cited

U.S. PATENT DOCUMENTS

| | | | |
|---|---|---|---|
| 3,065,366 | 11/1962 | Speiser et al | 310/152 |
| 3,129,347 | 4/1964 | Tognola | 310/15 |
| 3,736,448 | 5/1973 | Hebel, Jr. et al. | 310/30 |
| 4,023,056 | 5/1977 | Yamada et al. | 310/15 |

FOREIGN PATENT DOCUMENTS 1277185 10/1961 France .............................. 367/185

*Primary Examiner*—Howard A. Birmiel
*Attorney, Agent, or Firm*—Parmelee, Johnson, Bollinger & Bramblett

[57] ABSTRACT

A variable reluctance type firing sensor is mounted on an air gun for providing an electrical signal indicative of the instant of firing of the air gun. The firing sensor has a magnetic circuit which includes a permanent magnet, a pair of pole pieces and an armature including magnetically permeable material and which is free of mechanical restraint in its normal operating position, being held by magnetic attraction in position in the magnetic circuit. The armature freely "floats" on its "magnetic springs" within a thin walled chamber in which it is housed between the pole pieces, assuming a predetermined position of least magnetic reluctance. The armature which is acceleration-responsive is suddenly displaced from its predetermined position upon the firing of the air gun, and thus the reluctance of the magnetic circuit abruptly increases at the instant of firing. The armature is surrounded by a coil which produces a signal on the movement of the armature in the magnetic circuit in response to the firing of the air gun.

14 Claims, 9 Drawing Figures

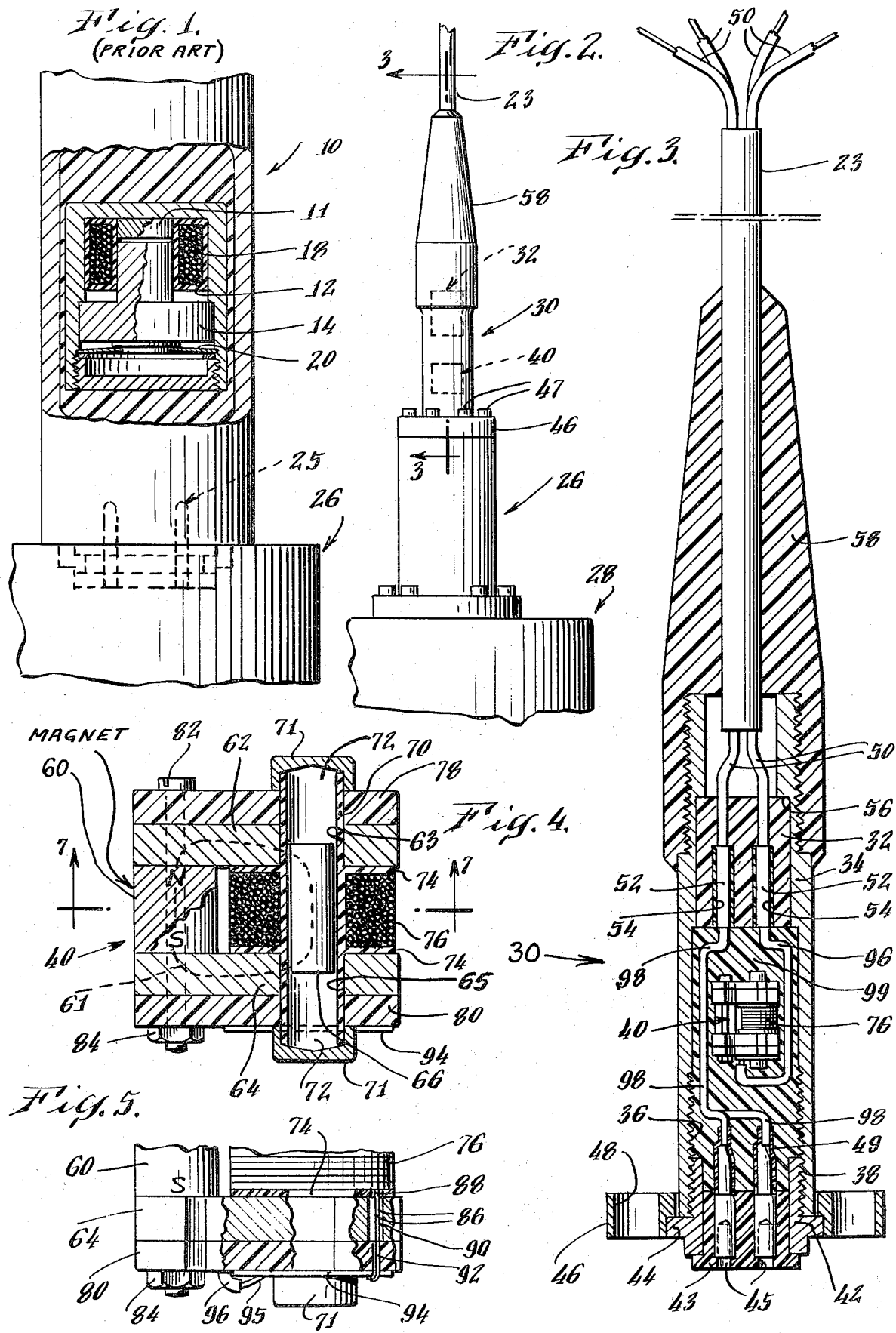

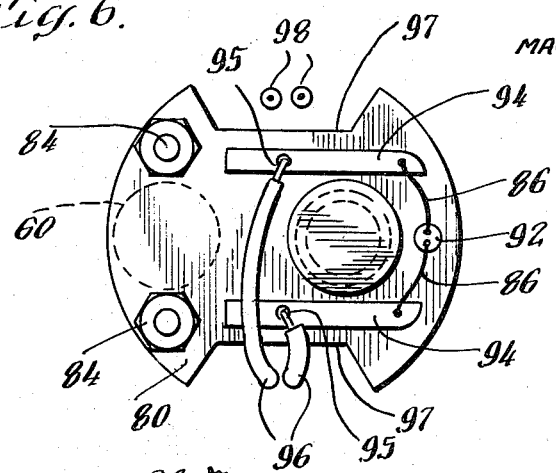
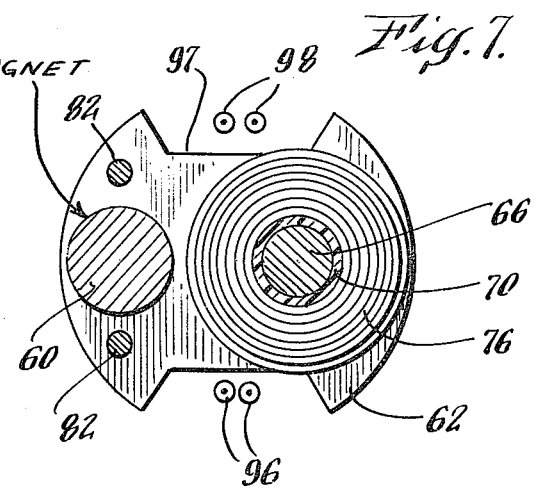
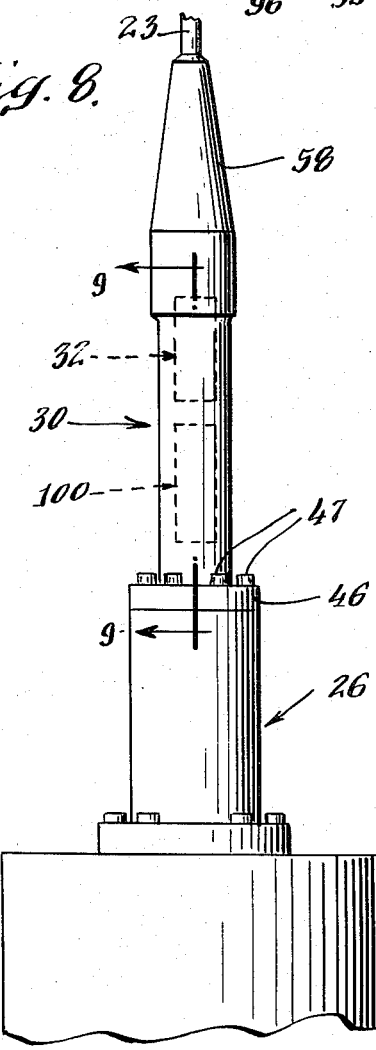
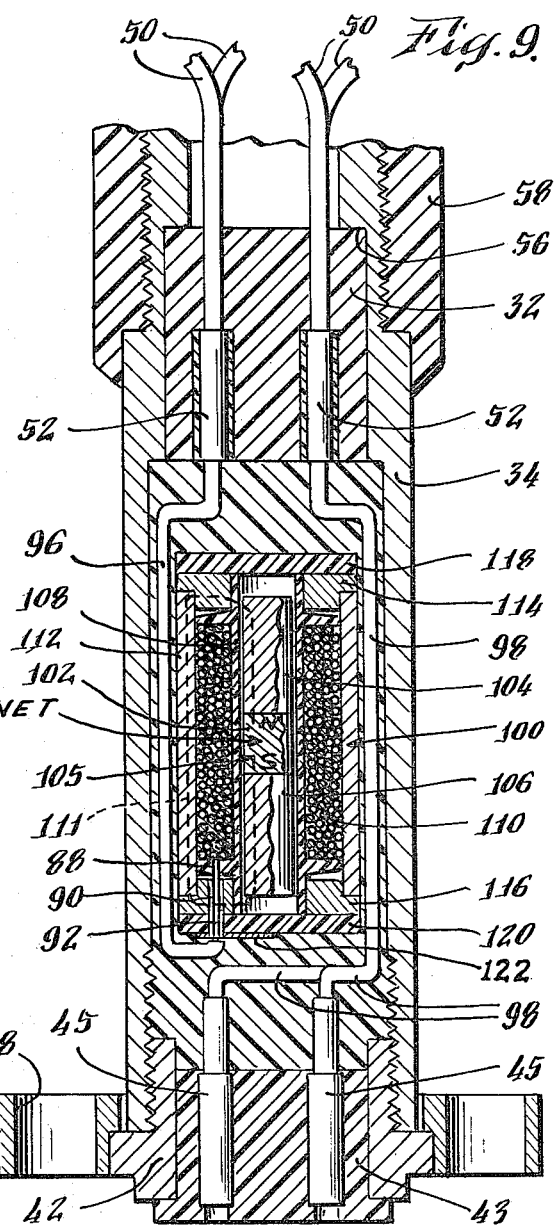

ACCELERATION-RESPONSIVE APPARATUS FOR SENSING FIRING INSTANT OF AN AIR GUN

BACKGROUND OF THE INVENTION

This invention relates to an air gun firing sensor apparatus and system for monitoring the firing of an air gun used for the generation of seismic energy in a medium for determining the actual instant of firing of the air gun.

In seismic surveying, air guns are utilized to generate powerful seismic energy impulses in order to investigate subsurface geological conditions and formations in the earth. For this purpose, one or more such air guns are each charged with pressurized gas, usually compressed air, which is temporarily stored in them. At the desired "shot" instant, the air guns are fired, and the pressurized gas is abruptly released into the surrounding medium. In this manner, powerful seismic energy impulses are generated capable of penetrating deeply into subsurface material to be reflected and refracted by the various geologic strata and formations. The reflected and refracted impulses are sensed and recorded to provide information and data about the geological conditions and formations.

For many applications, in both marine and land seismic exploration, it has been found advantageous to generate a plurality of seismic energy impulses from an array of air guns in order to provide a composite seismic signal of predetermined amplitude and frequency content and in spacial or array arrangements. For marine seismic surveying an array of air guns having various firing chamber volumes may be utilized in order to produce a composite seismic signal having a predetermined frequency distribution, as air guns of different firing chamber volumes generate seismic energy impulses with different frequency spectra. In such applications, as well as those in which air guns are repetitively fired or fired in sequence, it is desired to control the timing of the solenoid control valves which are used to trigger the firing of the respective air guns.

For further background on air guns and solenoid valves, reference may be made to U.S. Pat. Nos. 3,249,177; 3,379,273; 3,779,335; 3,588,039; 3,653,460; 3,997,021 and 4,038,630.

In the past, attempts have been made to synchronize the timing of the solenoid-controlled valves which trigger the individual air guns. However, the time at which a solenoid plunger actually becomes actuated in response to an electrical signal will vary with each valve, and then there are further variables caused by the mechanical structure of each air gun, such as dimensional tolerance variations, wear of parts, slight differences in shuttle mass, different frictional drag of moving parts, and so on. When the individual air guns are not actually operating in accordance with the prescheduled precisely timed relationship, then the downgoing seismic waves are not in accordance with the predetermined survey program, and less than optimum results are obtained. For example, if the survey program calls for all of the air guns to fire in synchronism, and they are not synchronized, the downgoing seismic waves are misaligned. Misalignment may cause reduction in total amplitude of the downgoing seismic waves or cause the generation of seismic waves with undesirable frequency spectra, or both, resulting in data collection with reduced penetration and resolution.

A solution to the problem of inaccurate firing ("shot") instant as set forth in U.S. Pat. Nos. 4,034,827 and 4,047,591 assigned to Texas Instruments, Incorporated has been to sense movement of a gas-releasing shuttle within each air gun by magnetic, electromagnetic or electrostatic field effects to establish the precise instant of firing of each individual air gun. The firing signals applied to the respective air gun solenoid valves are then delayed or advanced relative to each other in subsequent firings to properly synchronize or sequence the firings of the respective air guns. In those patents, the air guns are modified in order that a field such as a magnetic field be set up. The air guns are further modified in order that variations in that field caused by movement of the shuttle can be detected.

In the final paragraph of each of the above patents, possible arrangements for producing a magnetic, electromagnetic or electrostatic field and sensing variations in that field were listed. A primary disadvantage of each of the embodiments suggested in these patents is that one or more complex modifications of the air gun itself is required. Such modification of an air gun to include means for generating a magnetic, electromagnetic or electrostatic field plus means to sense variations in that field are generally complicated procedures which cannot be accomplished by an operating crew, and even such modification of air guns yet to be manufactured is costly. Further, any repairs by an operating crew to a sensor which is built into the air gun itself is time-consuming and costly.

Another type of air gun seismic source transducer unit 10 is illustrated in FIG. 1 in the form of an electromagnetic sensor which is enclosed in a case and directly mounted on a solenoid valve 26 of an air gun in a position between the electric cable connector (not shown) and the solenoid valve. In effect, the relatively long sensor unit 10 is interposed between the solenoid valve 26 and the cable connector. This prior art sensor unit 10 includes a permanent magnet 11 mounted in a case of magnetically permeable material 12, an armature 14 having a T-shaped cross-section and a coil form 16 in which a coil 18 is wound. An annular spring 20 supports the armature mass 14 and spring biases the armature 14 away from the permanent magnet 11 in order to prevent the armature from being attracted into contact with a mechanical stop. This structure provides a rather short-stroke magnetic transducer for sensing the firing of the air gun. The spring mounting structure suffers the disadvantage of relatively short life due to mechanical fatigue resulting from the continuous stress of resisting magnetic attraction and from the repeated sudden shocks generated by the firings of the air gun which ultimately cracks and destroys the spring 20. Furthermore, such an annular spring may contain numerous oblique slots therein which cause stress concentrations and make the spring prone to fatigue failure. Also, once the sensor as shown in FIG. 1 is actuated, the spring suspension will tend to cause the relatively massive T-shaped armature to resonate or vibrate for a long period of time. In addition, the rather short initial stroke will generate a limited amplitude electrical signal which may not differ much from the subsequent signals generated by the continued vibrations of the mass 14 and spring 20 after the initial shock. It should also be pointed out that mounting a separate transducer unit 10 on top of the solenoid valve awkwardly elongates the overall assembly of solenoid valve-sensor unit-cable connector. Also, mounting the sensor unit 10 between the cable connector and the solenoid valve inherently requires two sets of plugin connections. One set of plug-in connections occurs between the cable connector (not shown) and the top end of the sensor unit 10. The second set of plug-in connections as indicated in dotted outline at 25 occurs between the sensor unit 10 and the solenoid valve 26. Such a duplication of plug-in connections increases the chance for faulty connections to occur and otherwise makes the sensor unit more vulnerable to damage by the powerful mechanical shocks generated when the solenoid valve is actuated and the air gun fired.

For more background on air guns in apparatus employed for seismic surveying on land, reference may be made to U.S. Pat. Nos. 3,310,128; 3,779,335; 3,800,907 and 4,108,271.

SUMMARY

Accordingly, it is an object of this invention to provide a new and improved variable reluctance type firing sensor for determining the instant of firing of an air gun which is rugged, requires no modification to the basic air gun structure, and accordingly can be mounted with ease on older air gun units already in the field as well as being adapted to be employed with new air guns.

Another object of this invention is to provide a new and novel variable reluctance firing sensor for an air gun which is capable of withstanding large acceleration forces generated during the firing of the air gun and can provide accurate and reliable information with respect to the shot instant when the air gun is fired.

Still another object of this invention is to provide a new and novel acceleration-responsive apparatus for sensing the instant of firing of an air gun which is self-exciting and which provides a sharply defined and unmistakable large amplitude electrical impulse at the instant of firing and which quickly returns to its quiescent state so that the initial impulse is readily detected.

In carrying out this invention in one illustrative embodiment thereof, a variable reluctance type firing sensor is provided which is adapted to be mounted on an air gun for generating a sharply defined electrical signal indicative of the instant of firing of the air gun. The firing sensor includes a magnetic circuit having a permanent magnet therein and including two spaced portions. A movable armature is provided including magnetically permeable material and is positioned in said magnetic circuit with the movable armature normally being held by magnetic action in a predetermined position with respect to the two spaced portions of the magnetic circuit. The movable armature member is acceleration-responsive and suddenly moves away from its predetermined position with respect to the two spaced portions for changing the reluctance in the magnetic circuit upon firing of the air gun. A coil is coupled with the magnetic circuit for generating a sharply defined electrical signal of relatively large amplitude when the armature member is suddenly moved with respect to the two spaced portions in the magnetic circuit, thereby providing an indication of the instant of firing of the air gun.

In one preferred embodiment of this invention the magnetic circuit includes a permanent magnet and the magnetic circuit has two pole pieces which provide the two spaced portions in the magnetic circuit, with the movable armature being magnetically suspended or "floating" on "magnetic springs" in a predetermined rest position between the two pole pieces, such rest position being that of least magnetic reluctance.

In another embodiment the movable armature is a composite unit including the permanent magnet with two magnetically permeable end pieces, and the coil encircles the region in which the armature is located.

In another aspect of this invention the pole pieces have a predetermined thickness, and there is a predetermined spacing between the pole pieces with respect to the length of the armature which is magnetically suspended between the pole pieces, in order to provide a sharply defined electrical response upon movement of the armature away from its normal rest position as held by the magnetic suspension.

In another aspect of the invention leads from the coil are brought out in such a way through the magnetic circuit to prevent damage to the leads by vibration or contact with the magnetic member.

Advantageously, in accordance with another aspect of the present invention there is provided a firing sensor incorporated directly into the electrical cable connector which is plug-connected directly to the solenoid valve of the air gun. Accordingly, the firing sensor may be encapsulated in the connector assembly and thus be protected from the harsh environment in which the air gun and solenoid valve are immersed when the air gun is being operated.

Advantageously, acceleration-responsive sensor units embodying the present invention are well adapted to be utilized for marine seismic surveying operations with air guns and also to be utilized with air guns for seismic surveying operations on land.

BRIEF DESCRIPTION OF THE DRAWINGS

The invention, together with further objects, aspects, features and advantages thereof, will be more fully understood from a consideration of the following detailed description taken in connection with the accompanying drawings.

FIG. 1 illustrates a prior art variable reluctance type firing sensor shown in section longitudinally and being mounted directly on a solenoid valve of an air gun.

FIG. 2 shows an elevational view of an entire assembly of an electrical cable connector mounted on a solenoid valve which in turn is mounted on an air gun and in accordance with one aspect of the invention the variable reluctance sensor with "magnetic spring" armature suspension is incorporated in the cable connector.

FIG. 3 is an enlarged axial sectional view of the electrical cable connector, this axial sectional view being taken along line 3—3 of FIG. 2.

FIG. 4 is an enlarged cross-sectional view of a preferred embodiment of the variable reluctance type firing sensor of the present invention as illustrated on a smaller scale in elevation in FIG. 3.

FIG. 5 is an elevational view of a portion of the sensor shown in FIG. 4 which is partially in section to indicate the manner in which the coil leads exit from the sensor.

FIG. 6 is a bottom plan view of FIG. 5.

FIG. 7 is a cross-sectional view taken along line 7—7 of FIG. 4.

FIG. 8 is an elevational view of the entire assembly including the electrical cable connector, the solenoid valve and the air gun in another embodiment of this invention.

FIG. 9 is an enlarged axial-sectional view taken along the line 9—9 in FIG. 8 illustrating another embodiment of the variable reluctance type firing sensor of the present invention.

DETAILED DESCRIPTION

In the description that follows, like elements will bear the same reference numerals. Since solenoid valve operated air guns are well-known in the art, and since the invention does not reside in the particular structure of the air gun itself nor in the solenoid valve no detailed description of them will be made. There is a general reference to the air gun and solenoid valve, since the present invention is directed to apparatus for indicating the exact instant of the firing of an air gun which is triggered by a solenoid valve.

Referring now to FIG. 2, a high-strength submersible electrical cable 23 is coupled by an electrical connector assembly generally referred to by the reference number 30 to a solenoid valve 26, which is mounted on an air gun 28. The connector assembly 30 includes an anchor plug 32 which acts as a strain relief member and an acceleration-responsive firing sensor 40 which are both illustrated in dotted outline FIG. 2.

An application entitled "A High Strength Submersible Electrical Cable and Connector Assembly" Ser. No. 67,768 filed Aug. 20, 1979 which is assigned to the assignee of the present application describes a cable connector of the type in which the present invention may be incorporated. Illustrated embodiments of the present invention incorporate the firing sensor within the connector assembly, and accordingly the firing sensor portion of the connector assembly will be described in detail, while the rest of the connector assembly will be treated more generally.

Referring now to FIG. 3, the connector assembly 30 has the non-conductive anchor plug 32 and the firing sensor 40 housed in a stainless steel sleeve body member 34 which is internally threaded at 36 and is screwed onto the external threading 38 of a stainless steel end piece 42 having a flange 44 thereon. A removable fastening ring 46 is seated over this external flange 44 of the end piece 42, and this fastening ring 46 serves to secure the connector assembly 30 onto the solenoid valve 26 (FIG. 2) of the air gun 28 by machine screws 47 (FIG. 2) passing through holes 48 in the fastening ring.

In order to enable the electrical cable 23 and the connector assembly 30 to withstand the large vibrational stresses generated by the repeated firings of an air gun as well as other tension and flexural stresses resulting from the towing of a relatively long length of cable 23 through a body of water, this electrical cable has a plurality of insulated, high tensile strength stranded electrical conductors 50 (FIG. 3), for example four of them, two of which are coupled to the solenoid valve 26 and two of which are coupled to a firing sensor 40. The ends of the plurality of electrical conductors 50 of the cable 23 are mechanically fastened by crimping in four respective electrical connector sleeve elements 52 positioned and held in sockets 54 in the non-conductive anchor plug 32, which acts as a strain relief anchor member. The anchor plug 32 which is formed of any suitable, strong, non-conductive material, such as a tough plastic laminate, abuts axially against an internal shoulder 56 in the sleeve body member 34. As set forth in more detail in the aforesaid patent application, the anchor plug 32 is fluted around the outside diameter thereof to provide a plurality of longitudinally extending channels which facilitate the encapsulation of the whole interior of the connector assembly 30.

In order to plug-connect two of the electrical conductors 50 of the cable 23 to the solenoid valve 26, the end piece 42 includes a contact retainer 43 of suitable insulating material in which are mounted two electrical contacts in the form of sockets 45. Electrical connections are thus provided for the solenoid valve 26 of the air gun 28 by a suitable male plug having contact prongs (not shown) received into the contact sockets 45 of the connector assembly 30. Two of the electrical conductors 50 are connected to wires 98 which have their ends soldered to the sockets 45, and the soldered end portions of these two conductors 98 are supported by insulating shrink tubing 49. The cable 23, at the cable-end of the connector 30, extends through a tapered, stiffly flexible support member 58 which is molded around and bonded to the cable 23 for relieving bending stresses. The tapered stress relief member 58 may be of any suitable tough, stiffly flexible insulating material, such as rubber.

In the illustrated embodiment of FIG. 3, the magnetic acceleration-responsive sensor 40 is mounted within and encapsulated in the connector assembly 30 between the anchor plug 32 and the socket end piece 42. As will best be seen in FIG. 4, the firing sensor 40 is a magnetic, acceleration-responsive sensor having a magnetic circuit flux path 61 indicated by a dashed line which includes a permanent magnet 60, a pair of pole pieces 62 and 64 of magnetically permeable material and a movable armature member 66 of magnetically permeable material which is held by magnetic action in a predetermined position with respect to the pole pieces 62 and 64 of the magnetic circuit. The armature 66 is a circular cylindrical member formed of magnetically permeable material, for example such as soft iron. This movable armature 66 is housed in a thin-walled cylinder capsule 70 with a bore which forms an enclosed chamber 72 therein in which the armature 66 "floats" on "magnetic springs", so to speak, with a small air gap at each end of the pole pieces 62 and 64. The cylindrical capsule 70 is made of non-magnetic material, and its ends are closed by non-magnetic caps 71 of plastic or brass glued in place.

As will best be seen in FIG. 7, the permanent magnet 60 and the capsule 70 are circular cylindrical in shape with the cylindrical capsule 70 extending up and down through respective openings 63 and 65 in the pole pieces 62 and 64. The thin-walled capsule or cylinder 70 may be made of a suitable non-magnetic rigid material such as Delrin, or other rigid plastic. A spool-shaped coil form 74 having a pair of axially spaced flanges is molded to the exterior of the thin-walled hollow capsule 70 with a coil 76 being wound thereon encircling the capsule cylinder 70 with the movable armature 66 magnetically floating therein. Top and bottom layers of insulating material 78 and 80 are mounted on the upper and lower surfaces of the pole pieces 62 and 64, respectively. The sensor is held together by bolts 82 secured by nuts 84.

The coil 86 is wound of relatively fine gauge enamelcoated copper wire, referred to as magnet wire, and preferably contains at least five hundred turns. In order to protect the wire from electrical "shorting" with the pole piece, the electrical leads 86 from the coil 76 are brought out from the coil 76 as is best seen in FIG. 5. The coil wire leads 86 are brought out through a small opening 88 in one of the flanges of the insulated coil form 74, through a much larger opening 90 through the pole piece 64, and then through another small opening 92 in the insulated layer 80, with the ends of these coil leads 86 being soldered to a pair of conductive strips 94 serving as terminals for the coil leads 86. (As is best seen in FIG. 6). A pair of electrical conductors 96 have their ends 97 soldered to the conductive strips 94, and their other ends are connected as shown in FIG. 3 in connector sleeve elements 52 thereby connecting the conductors 96 to a pair of the cable conductors 50. The previously described electrical conductors 98 by-pass the sensor 40 as seen in FIGS. 6 and 7 and connect the electrical sockets 45 (FIG. 3) to the other pair of cable conductors 50 by means of a pair of the sleeve connectors 52 in the anchor plug 32.

In operation of the firing sensor 40 the sudden movement of the armature 66 away from its normal rest position suddenly changes the flux in the magnetic circuit and induces an electromotive force (emf) in the coil 76, thereby providing a sharply defined electrical signal which is fed through the sensor-connected pair of leads 96 and through a pair of the cable conductors 50 to the remotely located sensor monitoring and air-gun firing equipment, as will be understood. The firing sensor 40, being mounted on the solenoid valve of the air gun, is acceleration-responsive in the axial direction.

Before firing as hereinbefore described the armature 66 floats in a normal predetermined rest position on its "magnetic springs", being suspended between the pole pieces 62 and 64. The armature normally assumes a rest position in which the reluctance in the magnetic flux path circuit 61 is minimized. In the structural configuration as shown in FIG. 4 this minimum reluctance condition occurs when the armature is symmetrically positioned in bridging relationship with respect to the two pole pieces 62 and 64, that is, when the respective ends of the armature extend an equal amount into the respective openings 63 and 65 in the respective pole pieces 62 and 64. In this example the armature 66 has a length (L) equal to the axial distance (or span) (S) between the pole pieces 62 and 64 plus an amount equal to the thickness (T) of one of these equally thick pole pieces:

$$L = S + T \tag{1}$$

Under these specific conditions the minimum reluctance rest position, as shown in FIG. 4, occurs when the armature is inserted one-half of the way into the openings 63 and 65 in the respective pole pieces. The armature behaves as though powerful "springs" are holding it in this symmetrical position. The total magnetic flux in the magnetic circuit 61 is a function of the position of the armature 66 which controls the reluctance. When the air gun is fired, there is a momentary, sudden axial acceleration of the air gun as a whole. Consequently, there is a momentary, sudden acceleration of the sensor assembly 40 in a direction parallel to the axis of the floating armature 66. This sudden movement of the sensor 40 results in a sudden inertial displacement of the armature from its normal symmetrical floating position. This sudden movement of the armature 66 away from its symmetrical floating position abruptly increases the reluctance in the magnetic circuit 61, thereby abruptly decreasing the total magnetic flux. Such abrupt decrease in flux induces a sharply defined voltage pulse in the coil 76 which appears across the coil terminal wires 96.

It is among the advantages of this sensor 40 as shown in FIG. 4 that axial movement of the armature 66 by a distance of approximately ½T away from its symmetrical floating rest position causes a relatively large and sharply defined increase in reluctance in the circuit 61 because the armature is now momentarily fully inserted in one of the pole piece holes 63 or 65 while being fully removed from the other pole piece hole. Consequently, a relatively large change in flux occurs for advantageously producing a relatively large voltage pulse even though the sensor 40 is relatively small in size. The reason why at least five hundred turns are included in the coil 76 is to take advantage of the sudden large change in flux to generate a relatively large electrical signal impulse.

As previously stated, the armature 66 is held (floats) by magnetic attraction in a position of least reluctance. The non-linear nature of the change in reluctance of the air gaps results in a very sharp peak in the output from the coil 76 and thereby provides an extremely useful indication of the moment of the firing of the air gun. An initial sharply defined large amplitude signal is generated by the initial movement of the armature in response to the firing of the air gun. Then the signal voltage dies out rapidly by virtue of the fact that the armature motion is strongly damped by flow of the air trapped in the respective ends of the chamber 72.

This trapped air is caused to flow through the narrow clearance between the cylindrical side of the armature 66 and the bore of the cylindrical capsule 70. The air flow is opposite or counter to the movement of the armature, and air flow is occurring in a narrow clearance so that its flow velocity is great. Therefore, the fluid flow frictional damping exerted by the air flow on the moving armature is large and extremely effective in quickly damping and stopping movement of the armature.

The frequency response of the armature can be tuned by changing the mass and length of the armature as well as the width of the low permeability gap between each end of the armature and the respective holes 63 and 65 in the pole pieces. Increasing the mass of the armature decreases the frequency response and vice-versa. Increasing the size of the low permeability gap has the effect of decreasing the strength of the "magnetic springs", thereby decreasing the frequency response. A strongly damped frequency response in the range from 50 to 200 Hz is my presently preferred value.

One way in which to decrease the mass of the armature is axially boring out its ends to make the ends hollow. Reducing the mass of the armature not only increases the frequency response of the sensor but also aids the magnetic springs in holding or suspending the armature in its floating position.

It is not desirable for the sensor 40 to be responsive to extremely low frequencies, since the motion of the air gun being towed in the water or on a land vehicle being moved around could thereby produce a spurious "firing signal". The armature 66 may advantageously be made of a highly permeable material such as iron with protective coating material such as zinc, cadmium, enamel or gold plated thereon. The opposite ends of the armature are slightly chamfered to prevent gouging of the bore of the cylindrical capsule 70.

In one illustrative example as shown in FIG. 4, the permanent magnetic 60 was made of Hicorex 90 magnetic material made by Hitachi Magnetics Corporation of Midland, Mich. with a diameter of ¼ of an inch and a length of ¼ of an inch. The pole pieces were approximately ⅛ of an inch thick with an axial separation of ¼ of an inch therebetween, with an armature having a diameter of 0.158 of an inch and a length of ⅜ of an inch. The armature in suspension had its upper and lower ends suspended approximately midway inserted into the holes 63 and 65 in the upper and lower pole pieces. Thus, the symmetrically positioned armature overlapped about 1/16 of an inch into each of the pole piece holes 63 and 65. The coil 76 consisted of 1400 turns of No. 40 enamel-coated magnet wire having a resistance of approximately 85 ohms. The cylindrical capsule 70 and coil form 74 was made of Delrin. However, other rigid plastic material such as G-10 phenolic plastic obtainable from General Electric Company may be used. (The designation G-10 is a designation of the National Electrical Manufacturers Association). Since this sensor works at very low impedance it provides a dependable operation in marine and other harsh environments.

Since a large current is utilized to activate the solenoid valve, the sleeve body member 34 of the connector assembly 30 is made of ferromagnetic material, i.e. magnetically permeable material, such as ferromagnetic stainless steel, in order to provide shielding for the sensor 40 to prevent the coil 76 of the sensor from picking up the flux generated by the energization of the solenoid valve. Also to minimize any coupling, the two firing line conductors 98 (see FIG. 3) are kept close together and run along one side of the sensor 40. Also, the terminal lead conductors 96 which constitute the sensor line from the coil 76 are also kept close together and run along the opposite side of the sensor 40.

As seen in plan view in FIGS. 6 and 7 the pole pieces 62 and 64 and the dielectric layers 78 and 80 are circular with two diametrically opposed cut outs 97 for providing clearance for the respective pairs of insulated wires 96 and 98. Also, these cut outs 97 provide passages for the potting compound to flow axially within the connector sleeve body 34 (FIG. 3) as will now be explained.

After the cable 23 is attached to the connector assembly 30 in which the firing sensor 40 has been positioned, the internal cavity 99 in the sleeve body member 34 is filled with a suitable insulating potting material, such as polyurethane, through a threaded port (not shown) in the stainless steel body member. As described in the aforesaid patent application, the fluting of the non-conductive anchor plug 32 (and the cut outs 97 in FIGS. 6 and 7 herein) permits the flow of the potting material throughout the connector body 34 thereby filling the region where the conductors enter the connector assembly. Accordingly, the entire internal cavity or space 99 in the stainless steel sleeve body member 34 and the components therein including the firing sensor 40 are totally encapsulated with the potting material. This potting ruggedizes the entire assembly 30.

Another embodiment 100 of the magnetic acceleration responsive sensor is shown in FIGS. 8 and 9. In a manner similar to the embodiment shown in FIG. 3 the firing sensor 100 is incorporated in the connector assembly 30 which couples the cable 23 to the solenoid valve 26 mounted on the air gun 28. The structural difference between the two embodiments is best understood from a consideration of FIG. 9. In this embodiment, a permanent magnet 102 is positioned in the center of a movable armature 105 between an upper end piece 104 and a lower end piece 106 all of which form the movable armature 105. These end pieces 104, 106 are of ferromagnetic material, for example of soft iron. The armature 105 is movably mounted in the bore of a coil form and armature guide 108 of slippery plastic material. The bore of the spool-shaped coil form 108 provides a cylindrical capsule in which the cylindrical armature 105 moves with highly effective trapped air damping as described above.

A coil 110 is wound on the coil form and cylindrical capsule 108, e.g. 2,300 turns of No. 38 enamel-coated copper wire called magnet wire. The movable armature 105, coil form 108 and coil 110 are housed in a sleeve 112 of magnetically permable material, i.e. ferromagnetic material such as soft iron, terminated by upper and lower pole pieces 114 and 116, respectively of magnetically permeable (ferromagnetic) material, such as soft iron. Upper and lower plastic covers 118 and 120 are mounted on the outer surface of the upper and lower pole pieces 114 and 116, respectively. These pole pieces 114, 116 are rabbeted for receiving the ends of the sleeve 112 which seat in the annular rabbet groove.

Connections are made to the respective end portions of the wire of the coil 110 through holes drilled through the coil form 108, the pole piece 116 and the lower plastic cover 120 in a manner similar to that illustrated in FIG. 5. The ends of the coil wire extend through such holes so described and are soldered onto two separated copper areas 122 on the bottom of the plastic cover 120, similar to what is shown in FIG. 6. As in the other embodiment the sleeve 34 is made of ferromagnetic material such as ferromagnetic stainless steel for shielding the sensor from being coupled to the flux generated by the solenoid valve winding. Again, in this embodiment, the sensor-connecting conductors 96 are separated from the firing line conductors 98. The two lines of each pair of conductors are kept close together and the respective pairs of conductors run along the opposite sides of the sensor 100.

In the embodiment illustrated in FIG. 9 multiple-element movable armature 105 is again suspended and floats on "magnetic springs" in a magnetic circuit 111. The armature 105 is responsive to axial acceleration caused by the firing of the air gun which generates an emf in the coil 110 to generate a sharply defined signal of relatively large amplitude which is indicative of the instant of firing of the air gun. Also, in this embodiment the air which is trapped in the air pockets above the upper and lower end pieces 104 and 106 respectively, damp the oscillations of the armature immediately, which in effect produces a sharp electric pulse at the instant of firing which then is rather quickly damped out.

As used herein the term "magnetically permeable material" and the term "ferromagnetic material" are intended to mean the same thing, namely, any material having a high permeability for magnetic flux and a low coercivity with respect to magnetic flux, for example such as magnetically "soft" iron or steel.

Since other changes and modifications varied to fit particular operating requirements and environments will be understood by those skilled in the art, the invention is not considered limited to the examples chosen for purposes of illustration, and covers all changes and modifications which do not constitute a departure from the true spirit and scope of this invention as defined by the following claims.

What is claimed is:

1. A variable reluctance-type sensor adapted to indicate a sudden acceleration in a predetermined direction comprising:

a magnetic circuit, said magnetic circuit including two spaced pole pieces of magnetically permeable material, said pole pieces having aligned holes therein, an elongated thin-walled cylindrical capsule of non-magnetic material extending between said pole pieces, the ends of said capsule extending into said holes in said pole pieces, said sensor being adapted to be mounted with said elongated thin-walled cylindrical capsule extending in said predetermined direction in which said acceleration occurs, an elongated armature containing magnetically permeable material and being freely movable in the longitudinal direction within said cylindrical capsule, said elongated armature being in said magnetic circuit, a permanent magnet in said magnetic circuit, said elongated armature in its normal rest position having each end inserted at least partially into a respective one of said holes and being held in said rest position solely by magnetic action, and a coil coupled to said magnetic circuit for providing an electrical signal when said armature is suddenly displaced from said normal rest position.

2. A variable reluctance-type sensor as claimed in claim 1 in which:

said coil encircles said capsule and is positioned between said pole pieces.

3. A variable reluctance-type sensor as claimed in claim 1 or 2 in which:

said permanent magnet is included in said movable armature.

4. A variable reluctance-type sensor as claimed in claim 1 or 2 in which:

said permanent magnet is positioned outside of said coil and extends between said pole pieces.

5. A variable reluctance-type sensor as claimed in claim 1 or 2 in which:

said capsule contains trapped air in each end and there is only a small clearance between the inner surface of the capsule and the armature, whereby the trapped air is displaced by movement of the armature and flows through said small clearance in a direction counter to the movement of the armature for effectively quickly damping armature movement following an initial displacement of the armature caused by a sudden acceleration, thereby providing an electrical signal which quickly dies out following occurrence of the sudden acceleration.

6. A variable reluctance-type firing sensor adapted to be mechanically coupled to an air gun for providing an electrical signal indicative of the instant of firing of the air gun comprising:

a magnetic circuit having a permanent magnet therein, said magnetic circuit including two spaced portions, an axially movable armature member including magnetically permeable material in said magnetic circuit, said movable armature member normally being held by magnetic action in predetermined axial position with respect to said two spaced portions of the magnetic circuit, said movable armature member being acceleration-responsive for moving in an axial direction away from said predetermined position with respect to said two spaced portions for changing the reluctance in said magnetic circuit upon the firing of the air gun, a coil coupled with said magnetic circuit for generating an electrical signal when said armature member moves with respect to said two spaced portions of said magnetic circuit, an insulating layer on the outside of one of said spaced portions, a pair of separated conductive areas on said insulating layer, said insulating layer and said one portion having aligned openings therethrough, with said opening through said portion being larger than said opening through said insulating layer, the ends of said coil extending through said openings and being connected to said separated conductive areas, thereby providing electrical terminal contact means for said coil, and said firing sensor being mounted in a cable connector and being connected to wires in the cable, said cable connector being adapted to be secured onto a solenoid valve of an air gun, thereby indicating the instant of firing of said air gun.

7. A variable reluctance-type firing sensor adapted to be mechanically coupled to an air gun for providing an electrical signal indicative of the instant of firing of the air gun comprising:

a magnetic circuit having a permanent magnet therein, said magnetic circuit including two spaced portions, an axially movable armature member including magnetically permeable material in said magnetic circuit, said movable armature member normally being held by magnetic action in predetermined axial position with respect to said two spaced portions of the magnetic circuit, said two spaced portions being formed by two pole pieces of magnetically permeable material, said two pole pieces having aligned holes therein, said movable armature member being normally magnetically suspended in rest position symmetrically positioned in spanning relationship between said two pole pieces, the ends of said movable armature member being partially inserted equal amounts into each of said two holes when said armature is in rest position, said movable armature being acceleration-responsive for moving in an axial direction away from said rest position with respect to said two spaced pole pieces for changing the reluctance in said magnetic circuit upon the firing of the air gun, and a coil coupled with said magnetic circuit for generating an electrical signal when said armature member moves with respect to said two spaced pole pieces, thereby indicating the instant of firing of said air gun.

8. A variable reluctance-type sensor adapted to indicate a sudden acceleration in a predetermined direction comprising:

a magnetic circuit having a permanent magnet therein, said magnetic circuit including two spaced pole pieces of magnetically permeable material, said pole pieces each having a hole therein, said spaced pole pieces being mounted with said holes in aligned position, an elongated armature containing magnetically permeable material and normally being in rest position with its respective ends partially inserted into the respective holes in said pole pieces, said armature being axially movable with respect to said pole pieces and normally being suspended in said rest position solely by magnetic action with each end of the armature being partially inserted into one of said holes, said sensor being adapted to be mounted with the length of said elongated armature extending in said predetermined direction in which said acceleration occurs, and a coil coupled to said magnetic circuit for providing an electrical signal when the ends of said armature are suddenly displaced from said normal rest position with respect to said holes in said pole pieces as caused by sudden acceleration of said sensor in said direction.

9. The variable reluctance-type sensor set forth in claim 8 in which:

said coil encircles the region in which said axially movable armature is located.

10. The variable reluctance-type sensor set forth in claim 8 or 9 in which:

said two spaced pole pieces are coupled to said permanent magnet, and the ends of said armature are partially inserted into the respective holes and are overlapping approximately ½ of the thickness of the respective pole pieces when the armature is magnetically normally suspended in rest position.

11. The variable reluctance-type sensor set forth in claim 8 or 9 in which:

said axially movable armature is a cylindrical, multiple element armature comprised of said permanent magnet with magnetically permeable end pieces on each end thereof.

12. The variable reluctance-type sensor set forth in claim 8 or 9 in which:

said movable armature member is housed in a thin-walled, hollow, completely enclosed, elongated capsule, said capsule extends through the holes in each of said hole pieces, said capsule has air therein trapped beyond each end of said axially movable armature, and said trapped air rapidly damps axial movement of said movable armature in said capsule for damping said electrical signal rapidly after the initial electrical impulse caused by the sudden acceleration.

13. The variable reluctance-type sensor set forth in claim 8 or 9, in which:

said movable armature member is housed in a thin-walled, hollow, completely enclosed, elongated capsule, said thin-walled capsule extends through the holes in each of said pole pieces, and the ends of said armature are relatively partially inserted into the respective holes and overlap approximately one-half of the thickness of the respective pole pieces when the armature is suspended in said rest position solely by magnetic action.

14. The variable reluctance-type sensor set forth in claim 13 mounted within a cable connector for an electrical cable containing multiple wires, said cable connector being adapted to be connected to a solenoid valve for firing an air gun, a pair of said wires in said cable being connected through said cable connector to the solenoid valve for energizing the solenoid valve for firing the air gun, and a second pair of said wires being connected to the coil of said sensor within said cable connector, thereby providing an electrical signal over said second pair of wires for indicating the instant when the air gun is fired.

* * * * *